United States Patent [19]

Herring

[11] Patent Number: 5,692,431
[45] Date of Patent: Dec. 2, 1997

[54] BREAD BAKING

[75] Inventor: Michael Thomas Arthur Herring, Apethorpe Peterborough, Great Britain

[73] Assignee: Mackies (UK) Limited, Peterborough, Cambs, England

[21] Appl. No.: 578,577

[22] PCT Filed: Jun. 22, 1994

[86] PCT No.: PCT/GB94/01350

§ 371 Date: Apr. 2, 1996

§ 102(e) Date: Apr. 2, 1996

[87] PCT Pub. No.: WO95/00022

PCT Pub. Date: Jan. 5, 1995

[30] Foreign Application Priority Data

Jun. 25, 1993 [GB] United Kingdom ............... 9313170

[51] Int. Cl.⁶ .................. A21D 8/00; A21D 8/06; A47J 27/00; A21B 3/13
[52] U.S. Cl. .................. 99/426; 99/448; 99/450; 220/23.2; 220/23.4; 220/486; 220/743; 220/912
[58] Field of Search ............... 99/448, 450, 426–433, 99/353; 126/369, 373, 390; 220/23.2, 23.4, 23.8, 639, 367.1, 684, 486, 743, 912; 211/181; D7/357; 426/113, 243, 523

[56] References Cited

U.S. PATENT DOCUMENTS

| 1,470,273 | 10/1923 | Debs | 220/23.4 |
| 3,419,175 | 12/1968 | Laughlin | 220/486 |
| 3,572,537 | 3/1971 | Baltzer | 220/684 X |
| 4,014,451 | 3/1977 | Cannon et al. | 220/23.2 |
| 4,167,233 | 9/1979 | Crandall et al. | 426/523 X |
| 4,195,747 | 4/1980 | Hare | 99/426 X |
| 4,197,832 | 4/1980 | Thomas et al. | 126/390 |
| 4,229,494 | 10/1980 | Crandall et al. | 99/426 X |
| 4,595,120 | 6/1986 | Logan et al. | 220/469 |
| 4,645,090 | 2/1987 | Lewin | 220/23.4 |
| 4,922,811 | 5/1990 | Stumpf | 99/449 X |
| 5,026,958 | 6/1991 | Palacios | 99/DIG. 14 |
| 5,048,707 | 9/1991 | Hallberg | 220/912 X |

FOREIGN PATENT DOCUMENTS

| 0177262 | 4/1986 | European Pat. Off. |
| 2073582 | 10/1981 | United Kingdom |

*Primary Examiner*—Timothy F. Simone
*Attorney, Agent, or Firm*—McCormick, Paulding & Huber

[57] ABSTRACT

A bread baking pan and complementary protective carrier. The pan has edge flanges that enter complementary recesses at the edges of the carrier, and which serve to protect the user from injury by the edges of the pans. The carrier eliminates any air zones defined between the base of the pan and a corresponding face of the carrier, one embodiment of the carrier being fabricated from wire, and another embodiment providing face to face contact between the base of the carrier and the pan.

10 Claims, 2 Drawing Sheets

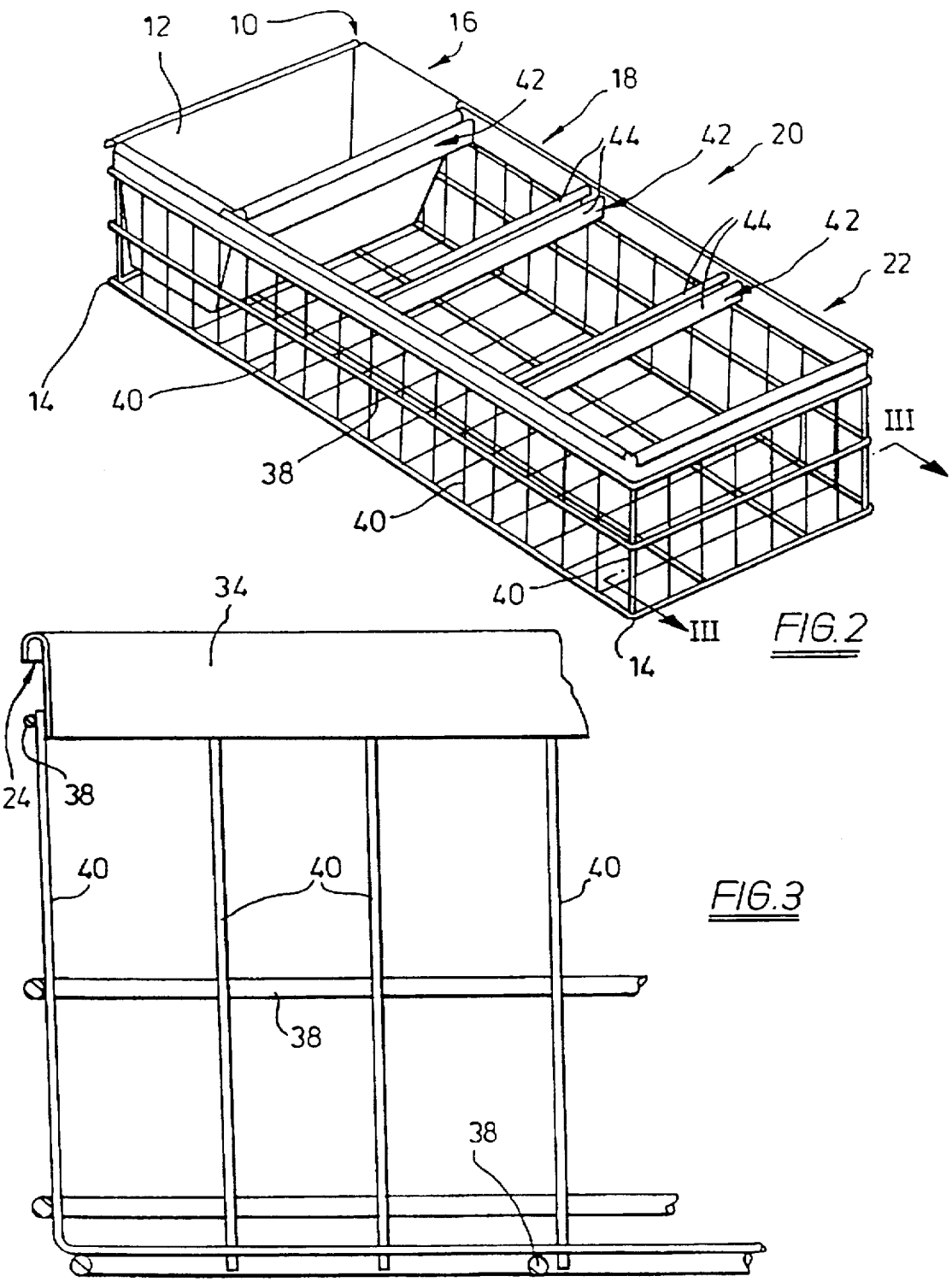

BREAD BAKING

This invention relates to bread baking and to a method and apparatus for use in bread baking. More particularly, the invention is concerned with a method and apparatus for use in relation to the moulds or pans in which bread is commercially baked.

The bread baking industry is one of the largest sectors of the world's manufactured food industry. In many areas bread is made in moulds or bread pans which define the final shape of the loaf. Bread pans have changed little in the last 100 years. They are normally made from 0.6 or 0.8 millimetre steel, coated with either tin or aluminium. Since the 1960's the inside of the pans has been coated with a silicone coating to help release the baked loaf and minimise the use of additional release emulsions.

Bread pans are frequently joined together in groups, normally of 4 or 6, to help with the mechanical handling on automated bread plants. Conventionally, the pans are assembled by metal fabricating techniques in the above-mentioned groups. Each pan itself forms an essential part of the structural integrity of the assembly. Each pan is welded to upper and in some cases, lower generally rectangular metallic straps, each of which defines a rectangular space into which the relevant number of pans is assembled. Each strap is endless and thus encloses the assembly of pans at the upper or lower edges of the pans. Between each pair of pans is a pair of short metal spacers. The entire assembly is formed by conventional fabrication techniques. The mechanical wear and operator abuse can be very severe in these bread plants, and sets of bread pans are traditionally designed in a very robust way to withstand these conditions. The result is that a set of 4 bread pans designed to make 4 loafs each weighing 800 grams will in themselves weigh in excess of 5 kilograms. Thus, the bread itself weighs only 39 per cent of the combined weight of the loaves and pans.

The silicone release coating on known bread pans enables a bakery to reduce by one half the amount of release emulsion which would otherwise be needed. The silicone gradually wears away however, and after about 1200 bakes the pans have to be treated by specialists operators to have the coated carbon and remaining silicone chemically stripped away, and a new coat of silicone applied. Typically, the life of a set of industrial bread pans is about 2.5 years and during this period they will be cleaned and reglazed 4 times.

It can thus be seen that conventional bread pan assemblies comprise a generally frame-like structure which includes the pans themselves. These pans are individually constructed so as to have sufficient strength in themselves to withstand the rigours of life in a commercial bakery. However, the pans are themselves welded into and form part of the frame work of the assembly. The pans themselves provide the vertical structure between the two upper and, in some cases lower endless straps which link the pans.

Accordingly, we have identified particular shortcomings of the conventional bread baking pan assembly, these shortcomings including the following. Firstly, there is the considerable weight of the assembly, as mentioned above. As a result, the thermal capacity of the assembly is correspondingly high and heat losses between successive bakings between the baking temperature of 250 degrees celsius and the dough introductory pan temperature of 60 degrees celsius are considerable. Likewise, there is a significant problem in terms of the difficulties of servicing the pans. It is a long and expensive process. Technical developments in this area have apparently been directed at improving this ease of service. A further factor concerns the limitations imposed on the coating which can be used on bread pans, this limitation arising from the need for the pan to be at least fairly readily serviced in the manner explained. A further factor is that, as mentioned, the entire assembly of bread pans and linking frame structure is discarded when the assembly has been used to an extent that sticking is a problem and further servicing is not economic. Likewise, there is the fact that even with the silicone coating of bread pans, there is still a need for the use of release emulsions.

All these shortcomings have been in existence for a considerable period of years and appear still to be accepted as inevitable.

There is disclosed in EP-A-0 177 262 (Lewin) a baking utensil designed for use in commercial baking operations in which a rigid frame supports baking pans therein. The frame has side walls, end walls and spacing struts forming compartments for the reception of individual pans. A particular feature of the frame construction is that the frame is in the form of a rectangular open-topped box with a bottom wall and side walls. Apertures in the form of slots are formed in the bottom wall at locations so as to communicate with the spaces between the bread pans. This disclosure goes a long way towards solving the problems of the conventional techniques described above.

A particularly significant technical shortcoming of this prior proposal concerns effectiveness of the baking of the bread in the pans having regard to the temperature in the surrounding oven space between the pan and carrier during baking. It is found that the construction disclosed in this prior specification has serious shortcomings in terms of baking effectiveness. We have, as a result of extensive investigations and test work established that this lack of baking effectiveness is due to inefficiency in heat transfer to the bread pans. Whereas in the Lewin specification it is stated that (page 5 line 18) the bottom of the pan is spaced from the bottom 19 of the frame, so permitting free flow of heat beneath and around the pan during baking operations, we have surprisingly discovered that this arrangement is in fact the source of the baking ineffectiveness of the Lewin disclosure.

Also disclosed in the above-mentioned prior EP specification is a method for connecting the bread pans to the supporting frame employing a clipping arrangement in which the edge portion of the bread pans locate around a multiple-thickness edge portion of the frame for location purposes, while being releasable for pan replacement purposes.

A particular feature of this latter construction, as shown in FIG. 2 of the prior EP specification concerns the edge portion of the thus-located bread pan in which provision is made for release of the bread pan by suitable engagement of a releasing tool with the edge portion of the pan. It is stated on page 5 at line 16 of the Lewin specification that: "When tucked-in in this way, an end portion 41 of each tab projects freely beneath the bead 28."

Shortcomings of this proposal include the fact that the edge portion of the pan projects in a generally outwardly-directed attitude and is thereby likely to become a safety hazard as well as possibly interfering with the free sliding movement of baking hardware within an oven during loading and unloading. This latter factor arises from the extremely arduous operating conditions to which baking utensils are subjected, in terms of impacts during oven loading and unloading, and other operations, these tending to lead to bending of any parts which project in any way.

A further factor in relation to the prior-disclosed clipping system concerns the difficulty of disengaging the clip from the co-operating edge of the frame, and indeed likewise the corresponding engagement operation. This difficulty arises from the design of the clipping arrangement whereby the engaging portion of the clipping edge of the baking pan has to be inserted into a relatively narrow gap defined by the edge portion of the frame.

Objects of the invention include the provision of a method and apparatus offering improvements in relation to the shortcomings of the prior art as discussed above, and generally.

According to the invention there is provided apparatus adapted for use in bread baking and the like, as defined in the accompanying claims.

In one embodiment, the lightweight removable pan has deformable edge flanges to be deformed into releasable mounting engagement with the carrier. The carrier is formed at at least one edge with a recess extending lengthwise along at least part of the edge and adapted to receive the outermost edge of the pan, so as to protect a user from injury by said edge. In this way, a simple arrangement is provided whereby not only is the pan secured to its carrier, but also the significant dangers to operatives and/or other disadvantages presented by the exposed edges of the pans are substantially eliminated. This is achieved without the need for any additional components and by the mere expedient of providing a recess, for example a rolled sheet metal edge, in the carrier.

Also in an embodiment described below the removable pan and its associated carrier are characterised by the absence of a still or laminar air zone defined between the base of the pan and the corresponding face of the carrier. In one embodiment this is achieved by having the carrier formed as an openwork or open lattice construction. In another embodiment this is achieved by having the carrier formed with a base plate which makes face-to-face contact with the base of the pan. Thus in both these arrangements, the still air zone located between the base of Lewin's carrier and the base of his pans is eliminated. Lewin teaches that this zone promotes good heat transfer. We have discovered that the opposite is the case and by eliminating this zone, substantial improvements in baking performance are achieved.

In an embodiment of the invention there is provided a baking utensil for use in commercial baking operations. The utensil comprises a rigid rectangular frame having side walls and at least one baking pan. The baking pan is made from metal with a thickness of between 0.10 and 0.35 millimetres, preferably from 0.15 to 0.30 millimetres and the specific preferred range being from 0.18 to 0.28 millimetres thickness mild steel. Alternatively, the pan can be formed from aluminum sheet of thickness lying in the range 0.25 to 0.6 millimetres. The pan is in the form of an open-topped box with straight or curved or corrugated side walls and base. The pan is secured to and supported by the upper edges of the side walls of the frame.

Particular features of an embodiment include the provision of an open base in the carrier, apart from a horizontal ledge extending around the periphery of the open base. Alternatively, the base may comprise a complete base plate for face-to-face contact with the corresponding flat base portion of the bread pans for direct conduction of heat therebetween. Air circulation holes are provided in the faces of the walls of the frame. Strengthening folds or ridges or ribs may be formed in the walls of the frame.

In another embodiment, which is particularly preferred, the frame is in the form of a wire mesh open-topped box with vertical, or nearly vertical walls and a wire mesh base or a plate-form base.

The upper edges of the carrier are curled-over to form an inverted U-structure, the U having a width of less than 6 millimetres. The rounded portion of the inverted U supports the pan top and replaces the conventional wire in the edge of conventional bread pans.

The pan edges are folded under the inverted U-form edge of the frame, through 90 degrees or more, and into the U-shaped structure so as to secure the pan in the frame, with no protruding edges. The arrangement is such that the pan edge projects inwardly into the U beyond the thickness of the metal thereof, so as to be engagable by an uncoupling tool for pan-removal purposes.

The frame may be provided with hardened or strengthened wear strips to maximise its working life. It will be understood that in use, pans frequently have to stand stationary while a conveyor is forcibly driven underneath them, thereby exerting a significant wearing effect.

We have ascertained that the most efficient arrangement for effective heat transfer to the bread pans is provided where the frame mounting and protecting the pans has the maximum degree of openness for circulation of high temperature air from within the oven and direct radiation heat on to the pan walls. Thus, one particularly preferred embodiment has the frame constructed as an open framework. For example, the open framework may be in the form of a wire fabrication, for example a basket-form wire or like construction. We have ascertained that in the case of such a wire fabrication construction, the degree of openness of the construction may be in the range 60 to 80%, based upon the area of the structure as a whole. This is to be compared with a degree of openness in the range of 35 to 60% which is readily achievable in the case of a sheet metal fabrication, which may indeed be used alternatively in cases where a lower degree of openness will suffice.

In accordance with the principles of the present invention, significant advantages over the previously proposed construction of Lewin are available for frame or framework constructions having openness of at least 10% and preferably 30% or more. In the case of the above-mentioned Lewin specification it is estimated that the degree of openness provided (ignoring, of course, the open-topped portion of the frame) is less than 10%, and probably in the range of 2 to 5%.

In accordance with the above-expressed principles of the present invention, heat transfer is maximised by virtue of radiation and turbulent air flow through the open form of the carrier. Moreover, the insulation effect produced by the previously proposed Lewin arrangement is thereby avoided.

It is to be understood that for certain applications of the present invention there will be provided a plate-form base portion in the supporting carrier for the bread pans. Such an arrangement is preferred for direct heat conduction to the bread pans by face-to-face contact, which is of particular importance in the case of ovens employing radiant heat conditions, and where the majority of the heat is transferred by conduction from a hot oven sole plate.

When the carrier has a solid base the degree of openness of the carrier is reduced to 30 to 50% where the remainder of the construction is mainly of wire mesh, and is reduced to 20 to 35% where the remainder is a sheet metal fabrication.

In the embodiments, the pan is of a replaceable or disposable material, for example a light gauge tin-coated steel. The gauge of the material may be comparable to that used in the food canning industry. The pan itself may be provided with a release coating, for example of ptfe.

With regard to the weight and strength of the individual pans, it is currently envisaged that lightweight tin plate may be used. Indeed, the lower end of the weight and strength range is represented merely by the weight and strength needed for the pan to perform a satisfactory job in relation to forming the bread, and in relation to the need for the pan to be satisfactorily structurally secured to the carrier, by deforming the pan edges. It is envisaged that for certain applications it might even be commercially practicable to adopt a material specification which enabled the material to be discarded at much shorter intervals than the intervals at which conventional bread pans are serviced or recoated.

It is expected that the weight saving in a bread pan assembly described herein, as compared with a conventional such assembly, will be in the range 40 to 70%. The weight saving will be affected to some extent by the number of bread pans in the assembly. Any number from 2 upwards is envisaged. Assemblies of 3, 4, 5 or 6 are the most usual.

A further advantage arising from the use of a separable and/or replaceable bread pan in a bread baking assembly arises from the fact that the replaceability of such a pan enables it to be designed without limiting it by the hitherto desirable requirement that it shall be recoatable with silicone at regular intervals. Accordingly, alternative coating materials thereby become available for use, including ptfe and more recent developments in this field.

In an embodiment, a baking mould assembly consists of an ultra lightweight baking mould or pan coated with ptfe release coating, and which requires no additional release emulsion. The pan is secured to a light robust carrier frame. When the release coating ceases to be effective, the complete mould or pan is discarded and replaced by a new one.

In the embodiment, the pan is formed from one piece of 0.2 millimetre tin plate, possibly perforated, and formed in a well established 2-stage press/forming process. The top edge of the pan is not provided with the traditional wired edge, but is left with a free edge to enable it to be deformed into the recess in a carrier frame.

The carrier frame comprises a 0.8 millimetre roll-form steel section to maximise strength with minimum weight.

Embodiments of the invention will now be described by way of example with reference to the accompanying drawings in which:

FIG. 2 shows a perspective view of a carrier and an associated bread pan, the carrier having spaces to receive three further bread pans; and FIG. 3 shows a section in FIG. 2 taken in the vertical plane joining the arrows III—III in FIG. 2.

Figure 1:
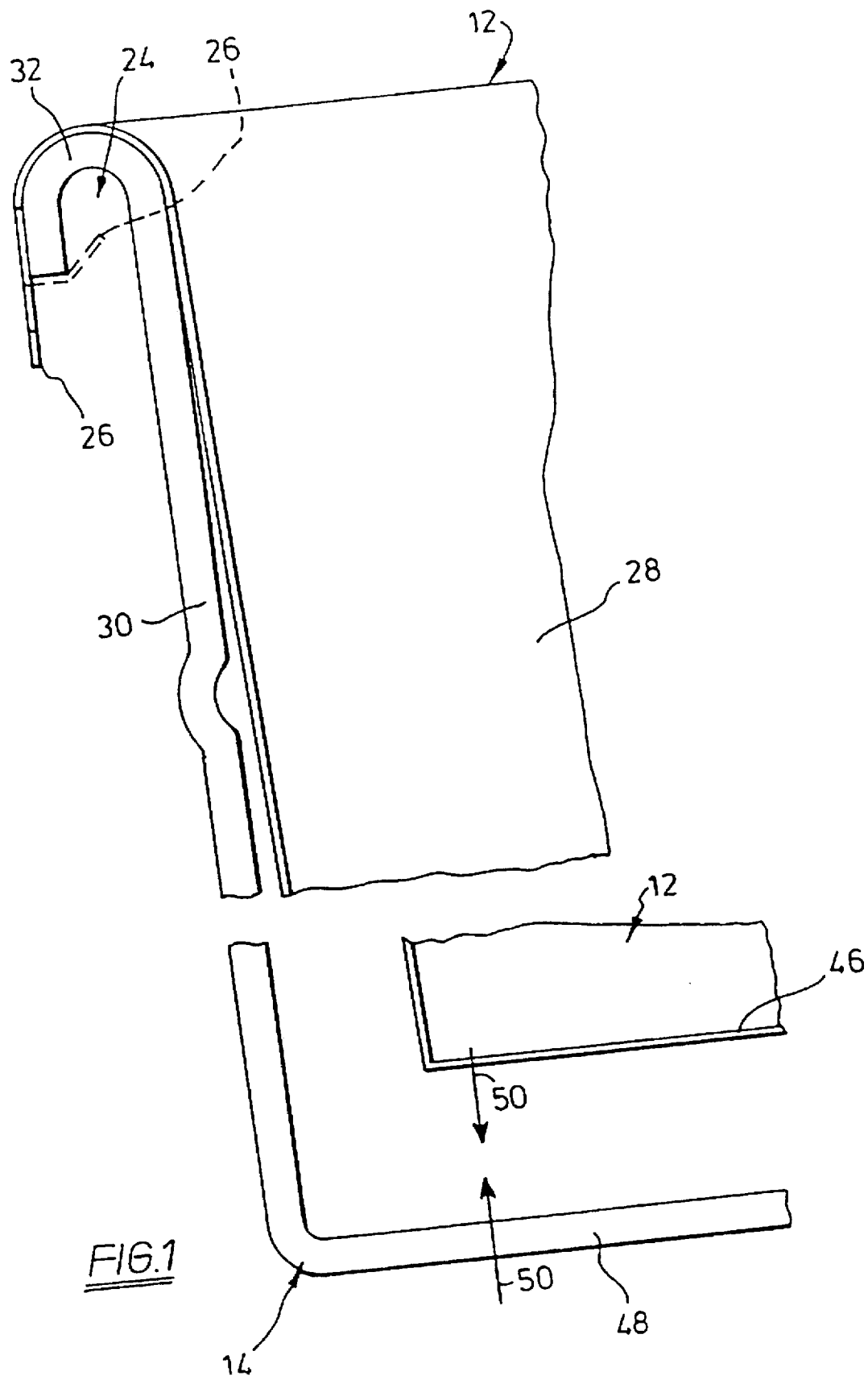
FIG. 1 shows, on an enlarged scale, a bread pan according to the invention in mounting relationship with a carrier.

As shown in the drawings, apparatus 10 adapted for use in bread baking and the like comprises a bread pan 12 to receive a body of dough (not shown), and a protective carrier 14 for the pan. Pan 12 is of lightweight construction and has insufficient structural strength to withstand normal commercial bread baking usage, whereas carrier 14 is of substantial fabricated construction and provides such structural strength.

As shown in FIGS. 2 and 3, carrier 14 is adapted to receive four pans 12 in side-by-side relationship in four corresponding pan locations 16, 18, 20 and 22. In FIG. 2, only one of the pans 12 is shown.

Details of the gauge and materials of pan 12 are to be found earlier in this specification we shall describe first the arrangement whereby the pans are mounted on and connected to the carrier, in a removable fashion. This is shown in FIG. 1 of the drawings.

As shown in FIG. 1, carrier 14 is formed along its four edges with recesses 24 extending lengthwise of those edges to receive the outermost edges 26 of the walls 28, as shown in FIG. 1. In this way, the pan 12 is connected to the carrier 14 and the edges 26 of the pan are protected and prevented from injuring a user.

In FIG. 1, it can be seen that carrier 14 comprises side walls 30 having rolled edges 32 in the form of U-formed elements and defining recesses 24. The carrier side walls are formed with substantial openings forming at least 10% and preferably 30% and above of the side wall and base area of the carrier.

FIG. 1 shows the edge region 34 of pan 12 deformed outwardly so as to conform exactly with the profile of the rolled edge 32 of carrier 14. When this has been done, outermost edges 26 of the pan extend downwardly as shown in full lines in FIG. 1, then, the outermost edges are deformed inwards and upwards into recesses 24.

Whereas in the embodiment of FIG. 1, carrier 14 has side walls 30 formed with substantial openings (not shown) whereby the walls are of openwork construction, in the embodiment of FIGS. 2 and 3, the carrier has sheet metal upper edge regions 34, and the lower portions of the carrier side walls are formed as a wire fabrication 36, comprising substantial horizontal wire elements 38 and somewhat less substantial vertical wire elements 40. The base is similarly constructed.

In the embodiment of FIG. 2, because carrier 14 is adapted to take four loaves at the four pan location 16, 18, 20 and 22 the individual pans each lack at least one side wall of the carrier for co-operative mounting engagement. Accordingly, three transverse roll-form pan-mounting channels 42 are provided in carrier 14, extending across its width, to receive the edges of the adjacent pans. Channels 42 are of similar form to edge region 34 of carrier 14 as seen in FIG. 3. Channels 42 function substantially as edge regions 34 of the carrier 14. For purposes of disengaging the pans from their associated carrier, a disengagement tool (not shown) is provided which can be inserted into recesses 24 to co-operate with the pan edges 26 therein so that these can be levered out for removal of the pan. It is noteworthy that by providing the edge regions in this form, space can be provided not only to receive the pan edges, but also the associated removal tool so that disengagement of the pan when required for servicing the carrier assembly is readily accomplished.

Each of the channels 42 has a pair of rolled wall portions 44 spaced apart and of similar construction to edge regions 34, for the purpose described above. The entire carrier assembly 14 is a steel fabrication though for particular applications certain parts may comprise aluminium, which will necessitate a revised assembly technique.

FIG. 1 also illustrates the relationship between the base 46 of pan 12 and the flat or plate-like base 48 of carrier 14. These parts are shown spaced apart as occurs at the commencement of assembly. When brought together as indicated by arrows 50 the two bases are in face-to-face contact and direct heat conduction therebetween is provided.

By virtue of the openwork construction of the wire mesh fabricated structures seen in FIGS. 2 and 3, and the openwork mild steel sheet metal fabrication shown in FIG. 1, effective heat transfer to pan 12 occurs through the openings of this structure, thereby eliminating the insulating blanket effect of the otherwise trapped air layer therebetween. In the case of the base region of the pan, a similar effect occurs when an openwork base in the carrier is provided. In the FIG. 1 embodiment, direct heat conduction occurs.

I claim:

1. Apparatus (10) adapted for use in bread baking comprising:

a) at least one pan (12) to receive a body of dough;

b) said pan being of lightweight construction so as to have insufficient structural strength to withstand normal bread baking usage;

c) a protective carrier (14) for said pan to receive said pan therein and to provide said structural strength therefor;

d) said pan being removably receivable in said carrier to enable replacement of said pan during the life of said carrier; and e) said pan having at least one deformable edge flange (34) to be deformed into releasable mounting engagement with said carrier;

f) said carrier being formed with at least one edge having a recess (24) extending lengthwise along at least part of said one edge characterised by g) said carrier being adapted to receive the outermost edge (26) of said pan, said edge projecting inwardly into said recess so as to protect a user from injury by said pan edge, said edge flange of said pan being removable from said recess by means of a tool insertable into said recess and engageable with said edge flange.

2. Apparatus (10) according to claim 1 characterised by said recess (24) in said edge region of said carrier having a generally inverted U-shape.

3. Apparatus (10) according to claim 2 characterised by said inverted U-shape being provided by a rolled edge region of a sheet metal edge portion of said carrier (14).

4. Apparatus (10) according to claim 1 adapted for use in bread baking and the like characterised by the absence of a still air zone defined between the base of said pan (46) and a corresponding face (48) of said carrier.

5. Apparatus (10) according to claim 4 characterised by said absence of a still air zone being provided by having said carrier (14) formed as an openwork construction.

6. Apparatus (10) according to claim 5 characterised by the degree of openness of said openwork construction being at least 10% based upon the open areas therein in relation to the closed areas.

7. Apparatus (10) according to claim 5 characterised by the degree of openness of said openwork construction lying in the range of 35 to 60%, and said carrier being formed as a sheet metal fabrication.

8. Apparatus according to claim 5 characterised by the degree of openness of said openwork construction lying in the range from 60 to 80% and said carrier comprising a wire fabrication.

9. Apparatus (10) adapted for use in bread baking comprising:

a) at least one pan (12) to receive a body of dough;

b) said pan (12) being of lightweight construction so as to have insufficient structural strength to withstand normal bread baking usage;

c) a protective carrier (14) for said pan to receive said pan therein and to provide said structural strength therefor, said carrier being formed with a base plate; and d) said pan being removably receivable in said carrier to enable replacement of said pan during the life of said carrier; characterised by e) the absence of a still air zone defined between the base (46) of said pan and a corresponding face (48) of said carrier, said absence of a still air zone being provided by having said carrier base plate make face-to-face contact with the base (46) of said pan.

10. Apparatus according to claim 9 characterised by at least part of the remainder of said carrier being of openwork construction.

* * * * *